United States Patent [19]
Benjamin

[11] 3,810,641
[45] May 14, 1974

[54] COLLET CHUCK FOR ROUTER HEAD AND THE LIKE

[75] Inventor: Milton L. Benjamin, Chagrin Falls, Ohio

[73] Assignee: Erickson Tool Company, Solon, Ohio

[22] Filed: Sept. 1, 1972

[21] Appl. No.: 285,744

[52] U.S. Cl. .................................................. 279/51
[51] Int. Cl. ............................................. B23b 31/20
[58] Field of Search ............. 279/52, 51, 47, 48, 49, 279/50, 53, 54

[56] References Cited
UNITED STATES PATENTS
| | | | |
|---|---|---|---|
| 3,451,686 | 6/1969 | Hammond | 279/51 |
| 2,469,014 | 5/1949 | Stalhandske | 279/49 |
| 2,449,887 | 9/1948 | Edel et al. | 279/49 |

FOREIGN PATENTS OR APPLICATIONS
| | | | |
|---|---|---|---|
| 558,055 | 12/1943 | Great Britain | 279/51 |

*Primary Examiner*—Gil Weidenfeld
*Attorney, Agent, or Firm*—Donnelly, Maky, Renner & Otto

[57] ABSTRACT

A three piece collet chuck of the push-pull type wherein a nosepiece having threaded engagement with the chuck body has radially interfitting engagement with the axially outer end portion of a tapered contractible collet to force the collet into, and to withdraw it from the correspondingly tapered bore in the chuck body respectively to grip and release the shank of a cutter therewithin, said collet being characterized in that it is axially slotted from its axially outer end to form at least three segments of relatively thick radial cross section which are integrally connected to a thin and flexible split ring portion at the axially inner end of the collet. The split ring portion aforesaid is formed by a counterbore in the axially inner end of the collet, one of the slots extending throughout the entire length of the collet and the remaining slots extending from the axially outer end of the collet to at least the bottom of the counterbore.

In another form of contractible collet, there is one axial slot through its entire axial length and radial wall thickness, and at least two peripheral axial grooves extending throughout the length of the collet leaving radially thin segment-connecting portions to enable wrapping of the segments around the cutter shank when the collet is forced into the tapered bore of the chuck body.

5 Claims, 7 Drawing Figures

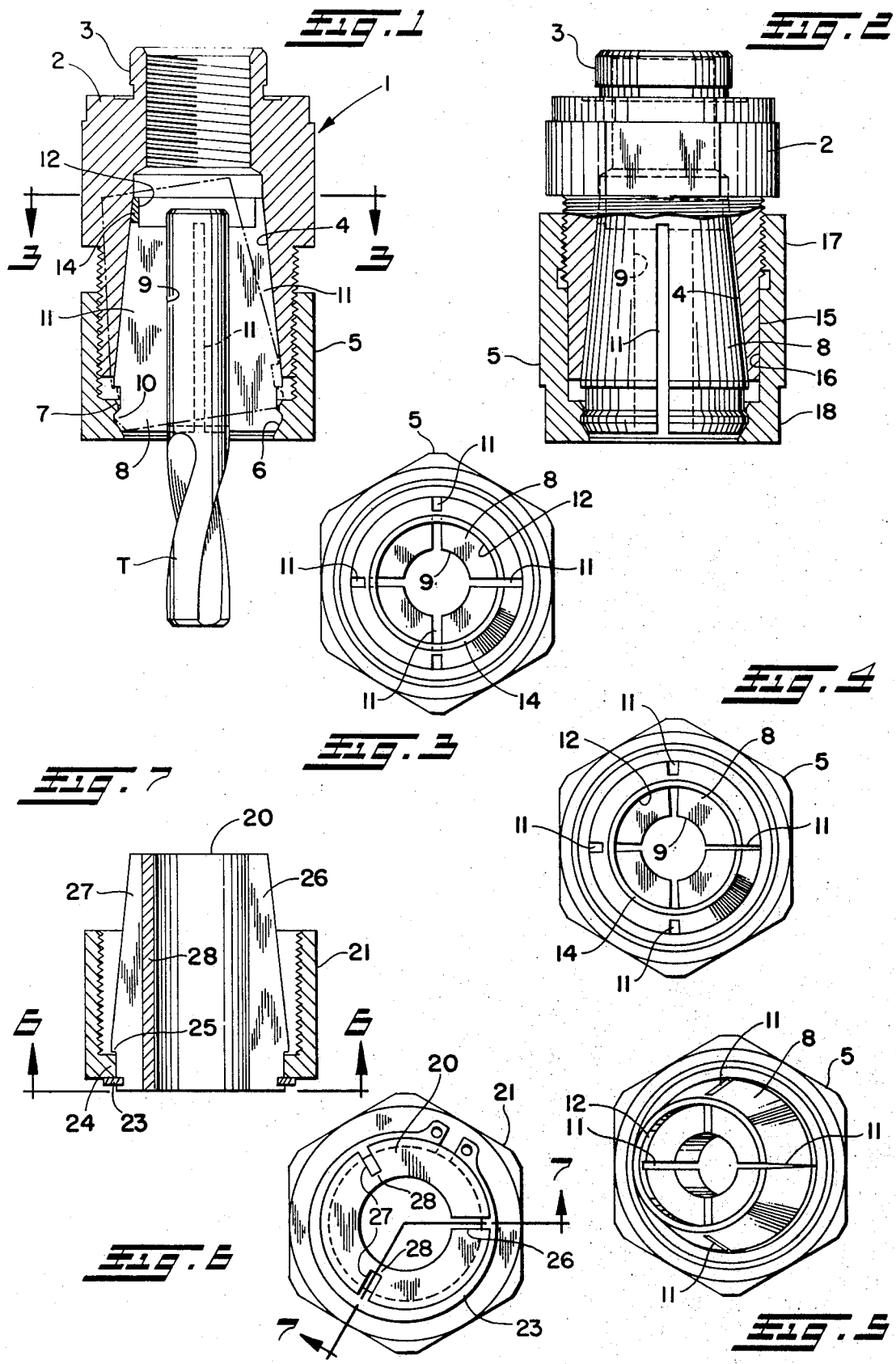

COLLET CHUCK FOR ROUTER HEAD AND THE LIKE

BACKGROUND OF THE INVENTION

Push-pull collet chucks are well known as disclosed, for example, in the following patents:

Milton L. Benjamin et al. — U.S. Pat. No. Re 25,318

Milton L. Benjamin — U.S. Pat. No. 3,035,845
Franklyn E. Winnen — U.S. Pat. No. 3,195,909
Milton L. Benjamin et al. — U.S. Pat. No. 3,365,204

Milton L. Benjamin et al. — U.S. Pat. No. 3,385,606

Milton L. Benjamin et al. — U.S. Pat. No. 3,425,705

In the above mentioned patents, the collets are either of the segmented type in which separate segments have springs therebetween and retainer bands therearound to hold the segments together for convenience in handling, or of the slotted one piece type in which the collets are alternately slotted from their opposite ends to provide circumferentially offset radially flexible segments at both ends. Although said segmented and slotted collets may readily be uniformly and accurately contracted into gripping engagement with a cutter shank, they are relatively costly to manufacture. Moreover, these collet chucks employ nose rings between the collets and nosepieces to maintain accuracy when the collets are collapsed through a wide range and some of these collet chucks employ needle or ball thrust bearings to achieve exceptionally strong grips on cutter shanks as required, for example, in precision N.C. machine tools.

SUMMARY OF THE INVENTION

In contradistinction to known push-pull type collet chucks, it is a principal object of this invention to provide a simple and accurate three piece collet chuck in which the single purpose collet has relatively thick segments integrally connected to a thin split ring at the axially inner end portion of the collet which enables uniform and accurate wraparound gripping of the cutter shank when the collet is forced endwise into the tapered bore in the chuck body directly by the nosepiece without requiring a nose ring or anti-friction thrust bearings.

It is another object of this invention to provide a collet chuck of the character indicated in which the collet may be readily snapped into and out of radially interfitting engagement with the nosepiece as when it is desired to replace one collet with another of different size.

It is another object of this invention to provide collet chuck having a tapered collet which is axially slotted throughout its length and radial thickness and which is formed with longitudinal peripheral grooves throughout its length to leave relatively thin portions which connect the chuck segments together for uniform wraparound contraction when the collet is forced endwise into the tapered bore of the chuck body.

It is another object of this invention to provide a tapered collet of thick wall construction which is counterbored at its small end and which has a plurality of equally spaced slots through the wall thereof, one of which slots extends throughout the length of the collet and the others of which extend longitudinally from the large end of the collet to at least the bottom of the counterbore at the small end thus to leave thin segment-connecting portions which allow wrapping of the segments around the tool shank when the collet is pressed axially by the nosepiece into the tapered bore of the chuck body.

It is another object of this invention to provide a tapered collet of the type described which has a radially projecting rib around its large end which interfits in an interior groove in the nosepiece so that tightening and loosening of the nosepiece on the chuck body will effect pushing and pulling of the collet into and from the tapered bore of the chuck body to effect gripping and releasing of the tool shank therewithin, the collet having adjacent segments of sufficient flexibility that, when it is desired to replace the collet, the large end thereof may simply be pushed axially out of the nosepiece or the small end of the collet may be shifted laterally to tilt it in the nosepiece thus to disengage the rib thereof from the interior groove of the nosepiece.

It is another object of this invention to provide a collet chuck of the character indicated wherein the nosepiece has a cylindrical exterior surface, and a bore concentric with the exterior of the nosepiece which is piloted on a cylindrical pilot of the chuck body, the latter being concentric with the tapered bore in the body whereby a tool shank will be accurately gripped and the chuck may be rotated at high speed without vibration as in a router head or the like.

Other objects and advantages of the present invention will become apparent as the following description proceeds.

BRIEF DESCRIPTION OF THE DRAWING

FIG. 1 is a central longitudinal cross section view of a collet chuck embodying the present invention;

FIG. 2 is a cross section view similar to FIG. 1 except illustrating a modification wherein the chuck body and nosepiece have interfitting pilot surfaces;

FIG. 3 is a top plan view of the nosepiece and collet alone as viewed downwardly along the line 3—3, FIG. 1;

FIG. 4 is a top plan view similar to FIG. 3 except illustrating in exaggerated form the contracted condition of the collet;

FIG. 5 is a top plan view similar to FIGS. 3 and 4 except showing the collet in tilted position for removal from the nosepiece, the tilted position of the collet being shown in phantom lines in FIG. 1;

FIG. 6 is a bottom plan view of a modified form of collet and nosepiece as viewed upwardly along the line 6—6, FIG. 7; and FIG. 7 is a cross section view taken substantially along the line 7—7, FIG. 6.

DETAILED DESCRIPTION OF THE PREFERRED EMBODIMENTS

Referring now to FIGS. 1 and 3–5, the collet chuck 1 shown for purpose of illustration comprises a chuck body 2 having a pilot 3 adapted to be screwed onto the motor spindle of a router head or the like, said body 2 having a tapered bore 4 which is preferably a sticking taper of about 12° included angle. Screwed onto the lower end of the chuck body 2 is a nosepiece 5 having an internal annular groove 6 with tapered flanks as shown and with a tapered wall 7 adjacent said groove 6.

Disposed within the tapered bore 4 of the chuck body 2 is a contractible collet 8 having a bore 9 of say 0.001 in. larger diameter than that of the shank of a router tool T or the like, the large end of the collet 8 having a peripheral rib 10 which fits in the groove 6 in the nosepiece 5. To render the collet 8 readily contractible, it is provided with four equally spaced apart slots 11 of which one slot extends throughout the length and radial thickness of the collet and the other three of which extend through the radial thickness and longitudinally through the large end of the collet from the bottom of the counterbore 12 in the small end of the collet 8 thus leaving three relatively thin sections which connect the segments together so that they may effectively be wrapped around the tool shank when the collet 8 is contracted as shown in FIG. 4. By providing the through slot 11 as shown, the adjacent segments are rendered very flexible at the large end of the collet 8 despite the great radial thickness of the collet 8 and hence the collet 8 may readily be snapped into and from the nosepiece 5 either by tilting the collet as shown in phantom lines in FIG. 1, or as shown in FIG. 5, or by pushing axially on the small (or large) end of the collet 8 as with the thumb while the nosepiece is held between the forefinger and the middlefinger.

In collet chucks 1 for routers and the like, the router tool T shank is generally quite small in relation to the diameter of the collet 8 and, by way of example, the mean diameter of the collet 8 may be two to three times the diameter of the tool shank and hence without the counterbore 12 at the small end of the collet 8, it is quite difficult to effect proper contraction of the collet 8 since the segments cannot easily be deformed to wrap around the shank of the tool T. As known, the strength of a beam varies as the cube of the height which, in this case, is the radial thickness of the segments and therefore, by providing the counterbore 12, the reduced radial thickness makes the split ring portion at the small end of the collet 27 times more flexible if the wall thickness at the small end is one third the thickness which it would be without the counterbore 12. Therefore, as the collet 8 is pushed into the tapered bore 4, the thin split ring 14 at the small end can be readily contracted while remaining of substantially circular form thus to assist in a wraparound action of the segments as the collet 8 is contracted.

In operation, it can be seen that with the tool T shank disposed within the collet bore 9, the tightening of the nosepiece 5 will effect, through the engagement of one flank of the nosepiece groove 6 with the correspondingly beveled side of the rib 10 effect an axial pushing or forcing of the collet 8 endwise into the tapered bore 9 thus to effect firm gripping of the tool shank accompanied by narrowing of the through slot 11 as shown in FIG. 4, and a relative swinging of the segments in the manner shown in exaggerated condition in FIG. 4, thus to firmly and uniformly grip the tool shank while maintaining true concentricity with the motor spindle. As can be clearly seen in FIGS. 1 and 3, the small end of the collet which interconnects the segments is in effect a thin split ring 14 of small radial thickness such as 0.031 or 0.046 in. which can readily be contracted with the segments wrapped around the tool T shank as represented in exaggerated condition in FIG. 4. Without the counterbore 12 at the small end of the collet, the split ring 14 in the aforesaid examples would be of 0.093 or 0.109 in. radial thickness and hence the segments cannot thus wraparound the tool shank except with application of extremely great force exerted by the nosepiece 5.

The collet chuck of FIG. 2 employs the same collet 8 as in FIG. 1, and the further improvements are the provision of a cylindrical pilot surface 15 on the chuck body 2 which is coaxial with the tapered bore 4, and a nosepiece bore 16 which is piloted on the pilot surface 15, the bore 16 being coaxial with the external cylindrical surface 17 of the nosepiece 5 whereby, the chuck, when mounted on the motor spindle may be rotated at high speed without objectionable vibration. As evident, all parts are coaxial with the motor spindle.

The nosepiece 5 may be provided with suitable wrench flats or hex 18 for tightening and loosening the nosepiece either to push the collet 8 into the chuck body bore 4 or to withdraw the collet 8 from said bore 4.

In FIGS. 6 and 7, the collet 20 is detachably retained in the nosepiece 21 by means of a snap ring 23 engaged in a groove in the collet 20 whereby, when the nosepiece 21 is tightened, its inturned flange 24 bears on the shoulder 25 of the collet 20 and, when the nosepiece 21 is loosened, the axially outer end surface of the inturned flange 24 engages the snap ring 24 to positively withdraw the collet 20 from the chuck body bore. To render the collet 20 of FIGS. 6 and 7 of desired flexibility to achieve the wraparound effect, it is provided with one through slot 26 and a pair of peripheral longitudinal grooves 27 which extend throughout the length of the collet 20 but which leave flexible bridge portions 28 to enable flexing of the collet segments with respect to the middle segment as the collet 20 is being pushed into the tapered bore of the chuck body.

I, therefore, particularly point out and distinctly claim as my invention:

1. A collet chuck comprising a chuck body having a tapered bore; a nosepiece having threaded engagement with said body; a contractible collet having a tapered exterior surface mating with said tapered bore; said nosepiece and collet having radially overlapping surfaces through which said collet is moved into and from said tapered bore upon tightening and loosening of said nosepiece thus to grip and release a tool shank within said collet; said collet having at least three longitudinal slots of which one extends through the entire length and radial cross section of said collet, and of which the remaining slots define segments which are connected together by radially thin sections to impart flexibility to said collet for wraparound effect on the tool shank upon tightening of said nosepiece; said collet being counterbored at its small end; and said remaining slots extending longitudinally at least from the bottom of said counterbore through the large end of said collet.

2. The collet chuck of claim 1 wherein said radially overlapping surfaces comprise an annular rib adjacent the large end of said collet yieldably detachably engaged in an annular groove in said nosepiece; and wherein the counterbored small end of said collet provides a flexible split ring which renders the chuck segments adjacent said one slot easily flexible for disengagement of said rib from said groove upon exertion of finger pressure on the large end of said collet or laterally on the small end of said collet to tilt the latter for disengagement of said rib with said groove.

3. A contractible collet having a central bore adapted to receive therewithin the shank of a tool to be gripped thereby; said collet having a tapered exterior surface coaxial with said bore adapted to be wedged into a corresponding tapered bore in a chuck body, the small end of said collet being counterbored to leave a radially thin ring portion, said collet having at least three axially extending slots one of which extends through the entire length and radial cross-section of said collet and of which the remaining slots extend through the radial cross-section of said collet from at least the bottom of said counterbore through the large end of said collet thus to define segments which are integrally connected to the small end of the collet by the flexible split ring thereat formed by said counterbore.

4. The collet of claim 3 wherein said collet adjacent its large end is provided with an annular rib which is adapted to be yieldably engaged in an internal groove of a nosepiece.

5. A collet chuck comprising a chuck body having a tapered bore; a nosepiece having threaded engagement with said body; a contractible collet having a tapered exterior surface mating with said tapered bore and having a central bore adapted to receive therewithin the shank of a tool to be gripped thereby; said collet at its small end having a radially thin ring portion; said nosepiece and collet having radially overlapping surfaces through which said collet is moved into and from said tapered bore upon tightening and loosening of said nosepiece thus to grip and release a tool shank within said collet; said collet having at least three longitudinal slots of which one extends through the entire length and radial cross section of said collet and of which the remaining slots extend through the radial cross section of said collet from said radially thin ring portion through the large end of said collet thus to define segments which are integrally connected to the small end of said collet by the flexible split ring thereat formed by said one slot extending through said ring portion to impart flexibility to said collet for wraparound effect of said segments on the tool shank upon tightening of said nosepiece; said radially overlapping surfaces comprising an annular rib on one of said collet and nosepiece disposed in an annular groove in the other of said collet and nosepiece; said flexible split ring rendering said segments adjacent said one slot easily flexible for disengagement of said rib and groove upon exertion of finger pressure on the large end of said collet or laterally on the small end of said collet to tilt the latter for disengagement of said rib and groove.

* * * * *